United States Patent
Park et al.

(10) Patent No.: US 12,538,111 B2
(45) Date of Patent: Jan. 27, 2026

(54) METHOD FOR NOTIFYING OF DISASTER SITUATION BY RAN NODE, AND DEVICE SUPPORTING SAME

(71) Applicant: LG Electronics Inc., Seoul (KR)

(72) Inventors: Sangmin Park, Seoul (KR); Sungduck Chun, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 18/015,600

(22) PCT Filed: Jul. 9, 2021

(86) PCT No.: PCT/KR2021/008773
§ 371 (c)(1),
(2) Date: Jan. 11, 2023

(87) PCT Pub. No.: WO2022/014963
PCT Pub. Date: Jan. 20, 2022

(65) Prior Publication Data
US 2023/0254677 A1    Aug. 10, 2023

(30) Foreign Application Priority Data
Jul. 13, 2020   (KR) .................. 10-2020-0086282

(51) Int. Cl.
*H04W 4/90* (2018.01)
*H04W 24/04* (2009.01)
*H04W 48/18* (2009.01)

(52) U.S. Cl.
CPC ............. *H04W 4/90* (2018.02); *H04W 24/04* (2013.01); *H04W 48/18* (2013.01)

(58) Field of Classification Search
CPC ....... H04W 4/90; H04W 24/04; H04W 48/18; H04W 8/02; H04W 48/02; H04W 48/12; H04W 60/04; H04W 48/08; H04W 84/042
(Continued)

(56) References Cited

U.S. PATENT DOCUMENTS

| | | |
|---|---|---|
| 8,068,808 B2 | 11/2011 | Smith |
| 9,088,989 B2 | 7/2015 | Smith et al. |
| 2012/0100848 A1* | 4/2012 | Miklos .................. H04W 16/08 455/432.1 |

FOREIGN PATENT DOCUMENTS

| | | |
|---|---|---|
| CN | 102006556 | 4/2011 |
| EP | 1991014 | 11/2008 |

(Continued)

OTHER PUBLICATIONS

3GPP, "3rd Generation Partnership Project; Technical Specification Group Services and System Aspects; Service requirements for the 5G system; Stage 1 (Release 17)," 3GPP TS 22.261 V17.2.0, Mar. 2020, 83 pages.

(Continued)

*Primary Examiner* — Huy C Ho
(74) *Attorney, Agent, or Firm* — Fish & Richardson P.C.

(57) ABSTRACT

A method and apparatus for notifying of a disaster situation by a radio access network (RAN) node. When the RAN node detects that a problem in an interface between the RAN node and a core network related to a public land mobile network (PLMN) has occurred, the RAN node stops transmitting a broadcast message currently being transmitted to a user equipment (UE), and transmits a disaster broadcast message to the UE. The disaster broadcast message includes: (i) information indicating that a disaster condition applies to a first PLMN; and (ii) information regarding a second PLMN related to the disaster condition. The disaster condition (Continued)

corresponds to the problem in the interface between the RAN node and the core network related to the first PLMN. The UE adjusts priorities of an PLMN selection based on information included in the disaster broadcast message for selecting the second PLMN.

15 Claims, 8 Drawing Sheets

(58) Field of Classification Search
USPC .................................................. 455/404.1
See application file for complete search history.

(56) References Cited

FOREIGN PATENT DOCUMENTS

| KR | 10-2015-0131697 | 11/2015 |
|----|-----------------|---------|
| WO | WO 2020/141964  | 7/2020  |

OTHER PUBLICATIONS

3GPP, "3rd Generation Partnership Project; Technical Specification Group Services and System Aspects; Study on Support for Minimization of Service Interruption (Release 17)," 3GPP TR 22.831 V17.1.0, Dec. 2019, 19 pages.

* cited by examiner

METHOD FOR NOTIFYING OF DISASTER SITUATION BY RAN NODE, AND DEVICE SUPPORTING SAME

CROSS-REFERENCE TO RELATED APPLICATIONS

This application is a National Stage application under 35 U.S.C. § 371 of International Application No. PCT/KR2021/008773, filed on Jul. 9, 2021, which claims the benefit of Korean Patent Application No. 10-2020-0086282, filed on Jul. 13, 2020. The disclosures of the prior applications are incorporated by reference in their entirety.

TECHNICAL FIELD

The present disclosure relates to a method for notifying a disaster situation by a Radio Access Network (RAN) node and an apparatus supporting the same.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Mobile communication service is becoming an indispensable service in daily life, and communication operators are making various attempts to prevent service interruption. For example, a communication operator may install multiple wired networks in a core network section (e.g., multiple wired networks between core network nodes), and even if a problem occurs in one wired network, communication services may be continuously provided using another wired network. Alternatively, a communication operator may install a plurality of core network nodes, such as AMF, so that even if a problem occurs in one core network node, other core network nodes perform backup to prevent communication services from being disconnected.

However, in the event of a disaster such as fire or earthquake, the above countermeasures may not be helpful. For example, in the event of a fire, all communication networks connected to the outside from one node of the wireless network may be lost. In addition, in a virtualized cloud environment, a plurality of core network nodes is likely to be installed in one data center located in the same region. Therefore, if a fire or an earthquake occurs in an area where a data center is located, there is a high possibility that functions of all core network nodes will be lost no matter how many core network nodes are installed.

SUMMARY

When a communication service is not possible through a network of a specific operator due to a disaster, a method of minimizing service interruption by temporarily roaming a subscriber of the operator to a network of another operator in the vicinity is being discussed. In this case, a method of quickly notifying the subscribers of the corresponding operator that a disaster has occurred may be required.

In an aspect, a method performed by a User Equipment (UE) operating in a wireless communication system is provided. The method comprises receiving a disaster broadcast message from a Radio Access Network (RAN) node. The disaster broadcast message includes (i) information indicating that a disaster condition applies to a first Public Land Mobile Network (PLMN), and (ii) information about a second PLMN related to the disaster condition. The disaster condition is a problem in an interface between the RAN node and a core network related to the first PLMN, and a broadcast message other than the disaster broadcast message is not received from the RAN node.

In another aspect, a method performed by a Radio Access Network (RAN) node operating in a wireless communication system is provided. The method comprises detecting that a problem has occurred in an interface between the RAN node and a core network related to a first Public Land Mobile Network (PLMN), stopping transmission of a broadcast message currently being transmitted to a User Equipment (UE), and transmitting a disaster broadcast message to the UE. The disaster broadcast message includes (i) information indicating that a disaster condition applies to the first PLMN, and (ii) information about a second PLMN related to the disaster condition. The disaster condition is a problem in the interface between the RAN node and the core network related to the first PLMN.

In another aspect, an apparatus for implementing the above method is provided.

The present disclosure can have various advantageous effects.

For example, in the event of a disaster in the 5G system, disaster information can be effectively provided to the UE through the RAN node that provided the service.

For example, it is possible to achieve enhancement of user experience and maintenance of service continuity by allowing the UE to effectively receive service without service interruption even in the event of a disaster.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
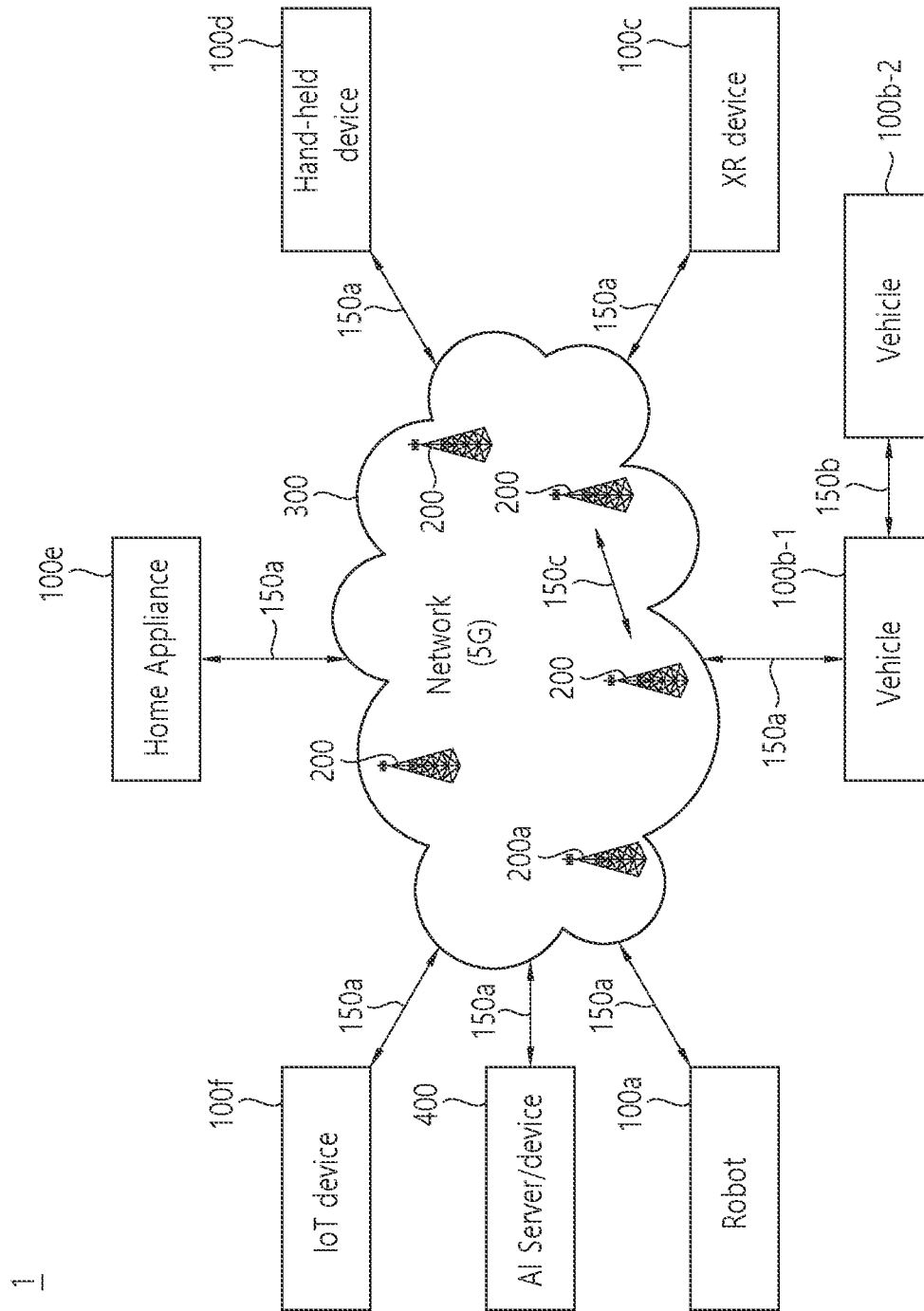
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A. B and C" may mean "only A", "only B", "only C", or "any combination of A, B and C". In addition, "at least one of A, B or C" or "at least one of A. B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a. 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
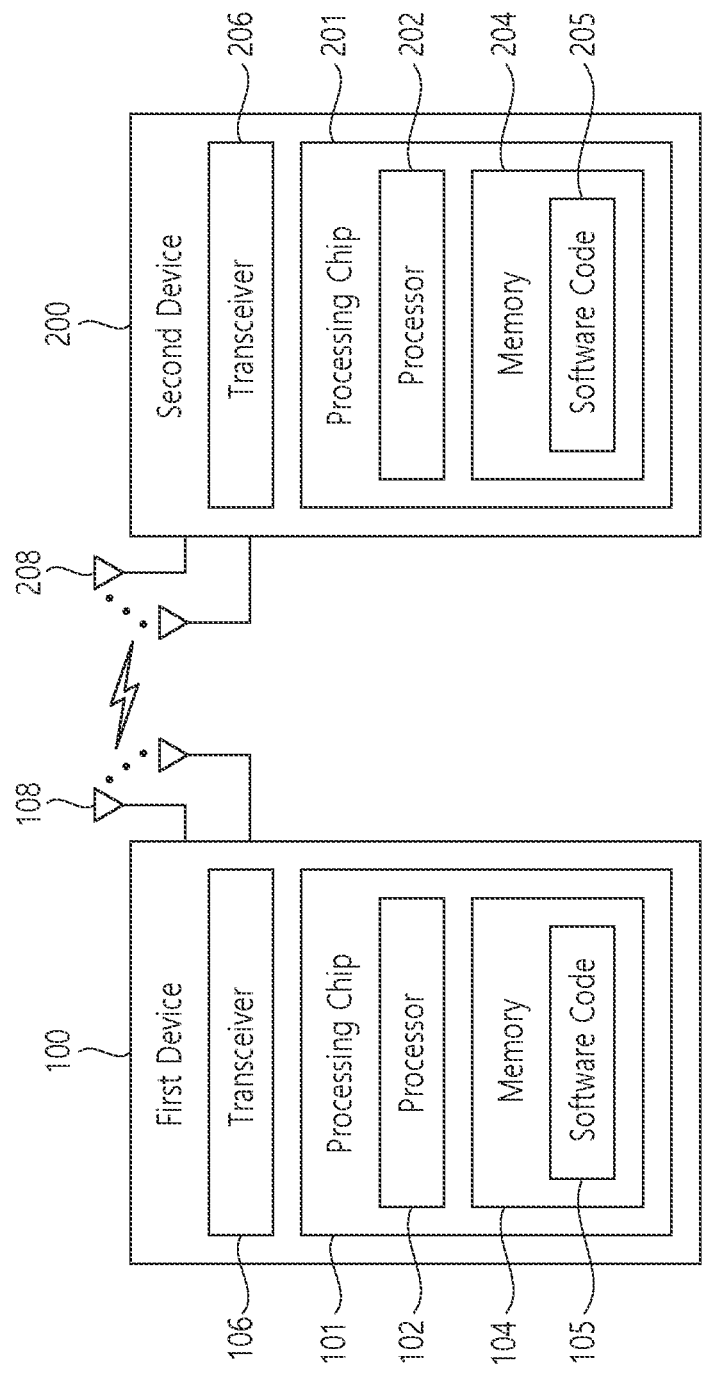
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
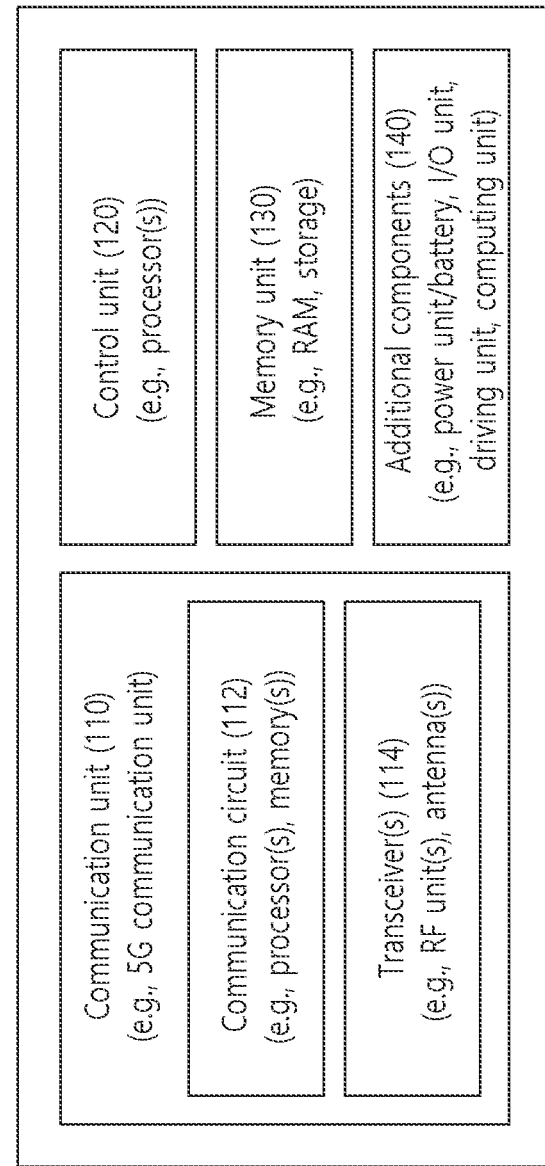
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (000c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a dynamic RAM (DRAM), a ROM, a flash memory, a volatile memory, a non-volatile memory, and/or a combination thereof.

Figure 4:
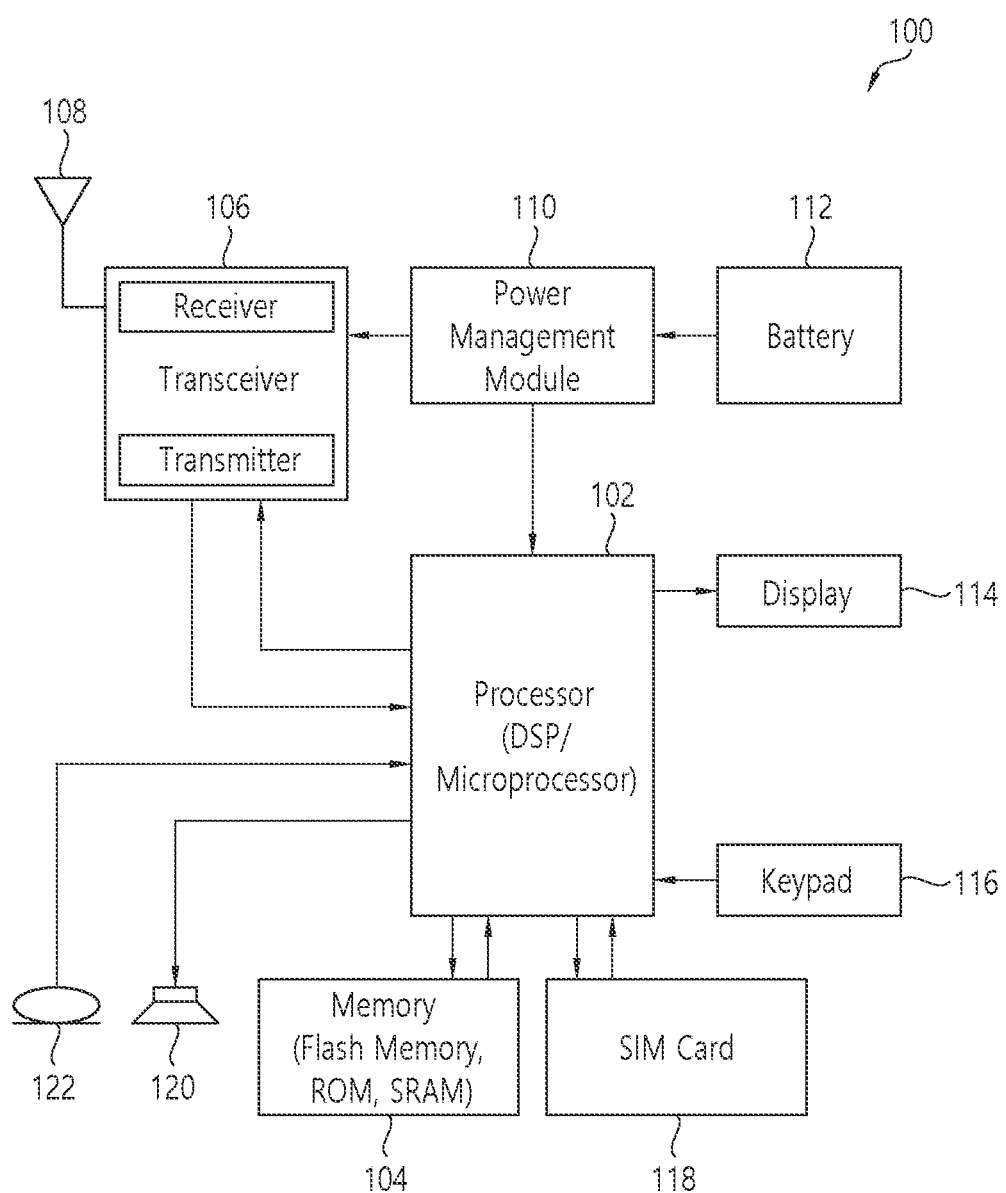
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS® series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
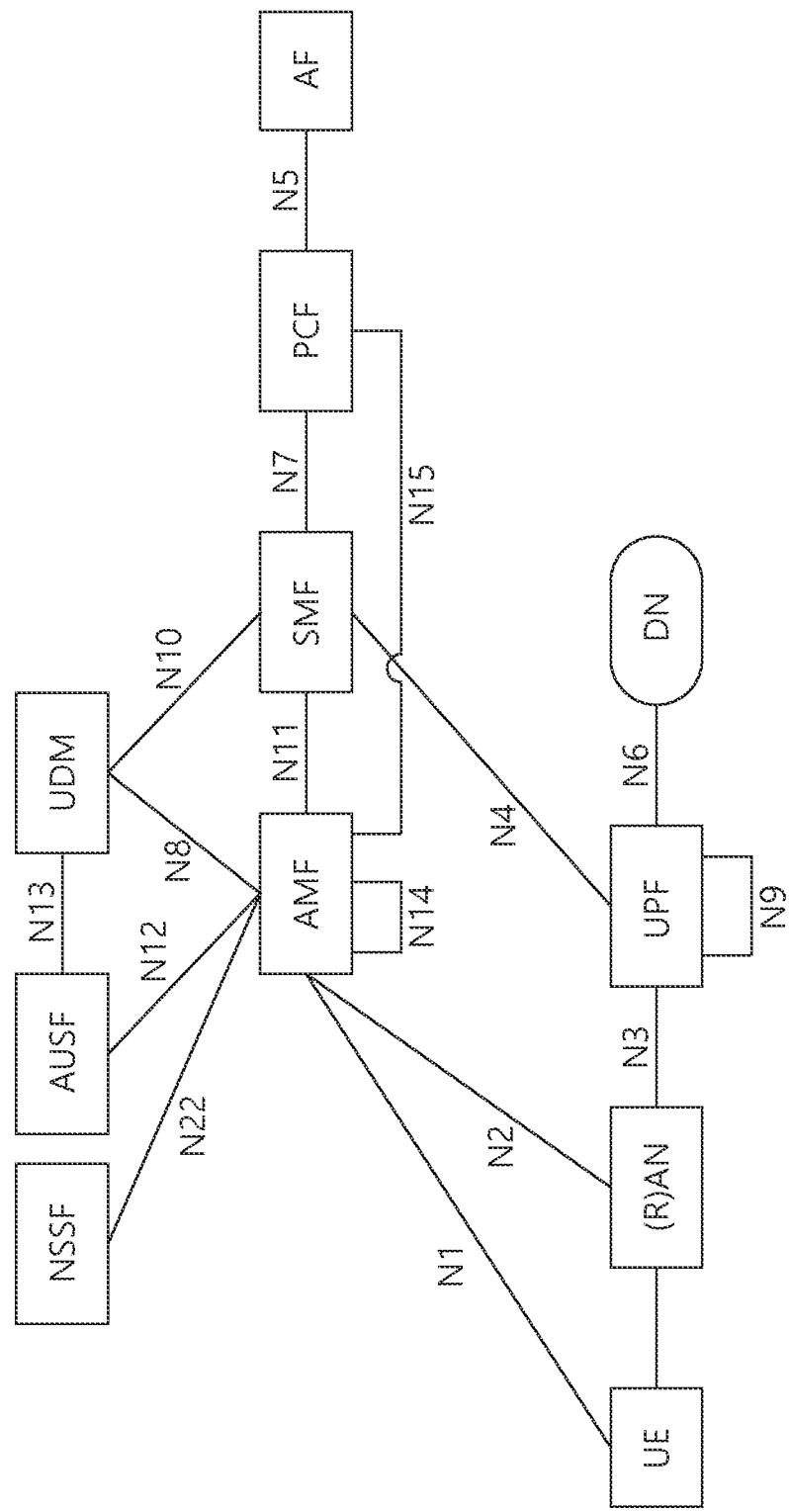
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).
 Authentication Server Function (AUSF)
 Access and Mobility Management Function (AMF)
 Data Network (DN), e.g., operator services, Internet access or 3rd party services
 Unstructured Data Storage Function (UDSF)
 Network Exposure Function (NEF)
 Intermediate NEF (I-NEF)
 Network Repository Function (NRF)
 Network Slice Selection Function (NSSF)
 Policy Control Function (PCF)
 Session Management Function (SMF)
 Unified Data Management (UDM)
 Unified Data Repository (UDR)
 User Plane Function (UPF)
 UE radio Capability Management Function (UCMF)
 Application Function (AF)
 User Equipment (UE)
 (Radio) Access Network ((R)AN)
 5G-Equipment Identity Register (5G-EIR)
 Network Data Analytics Function (NWDAF)
 CHarging Function (CHF)
 Furthermore, the following network functions may be considered.
 Non-3GPP InterWorking Function (N3IWF)
 Trusted Non-3GPP Gateway Function (TNGF)
 Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR. NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:
 N1: Reference point between the UE and the AMF.
 N2: Reference point between the (R)AN and the AMF.
 N3: Reference point between the (R)AN and the UPF.
 N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AMF.

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: Reference point between the PCF and the AMF in the case of non-roaming scenario, PCF in the visited network and AMF in the case of roaming scenario.

N16: Reference point between two SMFs. (in roaming case between SMF in the visited network and the SMF in the home network).

N22: Reference point between the AMF and the NSSF.

In some cases, a couple of NFs may need to be associated with each other to serve a UE.

Radio Access Network (RAN) nodes, such as gNBs or eNBs (including ng-eNBs in 5G systems) or non-3GPP access in 5G systems providing wireless connectivity in 3GPP systems, broadcast characteristics of the radio section provided by the RAN nodes or parameters related to the radio section, etc., through a System Information Block (SIB). The configuration of the SIB or the information included in the SIB is different for each SIB.

In order for the UE to receive a service, the UE selects one of Public Land Mobile Networks (PLMNs) that can be physically accessed from where the UE is located.

Hereinafter, minimization of service interruption (MINT) will be described. S3.1 and S6.31 of 3GPP TS 22.261 V17.2.0 (2021 March) may be referred.

The most efficient way to prevent interruption of communication services in the event of a disaster is to use roaming. That is, if communication service cannot be received from the communication operator to which the user subscribed due to a disaster, interruption of communication service can be prevented by roaming to another nearby communication operator's network to receive communication service. More specifically, each communication operator may actively install a wireless network and a core network in an area (e.g., one country) for which it is licensed. Different communication operators may construct networks in different ways and/or install core network nodes in different buildings, so even if a disaster occurs, it may not affect all communication operators equally. That is, a problem that occurs in one communication operator may not be equally likely to occur in another communication operator.

In 3GPP Rel-17, a MINT is being discussed in which, in the event of a disaster, a UE receiving a communication service from a communication operator affected by the disaster roams to a network of another communication operator so that the communication service can be continuously received.

Figure 6:
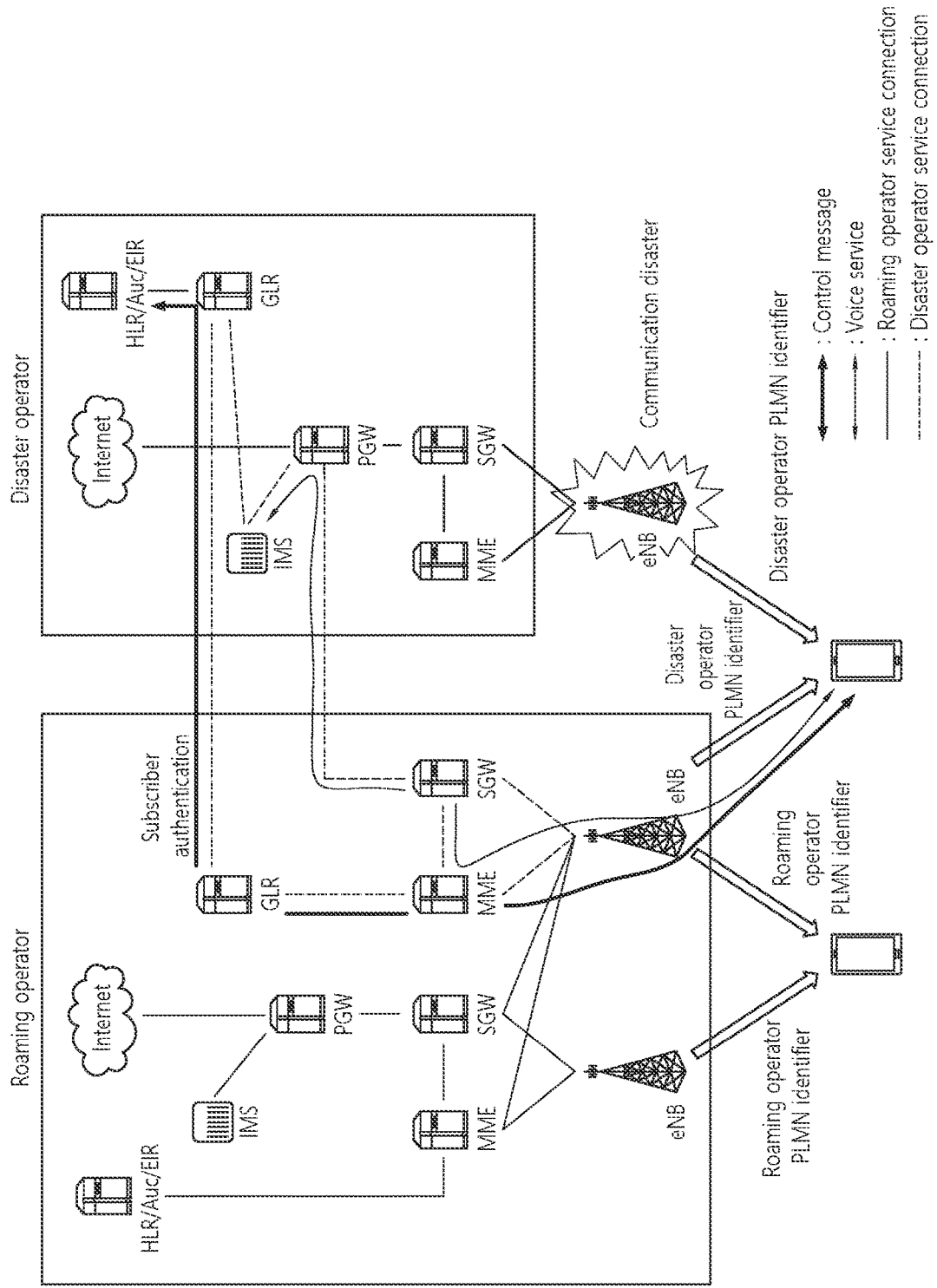
FIG. 6 shows a concept of MINT to which implementations of the present disclosure is applied.

FIG. 6 shows a concept of MINT to which implementations of the present disclosure is applied.

Referring to FIG. 6, when a disaster occurs, the roaming operator can accommodate subscribers of the disaster operator by broadcasting the PLMN identifier of the disaster operator. In addition, in order to accommodate subscribers of the disaster operator in case of a disaster, the PLMN identifier of the disaster operator is registered in the core network of the roaming operator, the wireless network broadcasts the corresponding PLMN identifier in the SIB message, and traffic can be mutually transmitted through the core network between operators.

In order to enable the third party to accommodate its roaming subscribers in the event of a communication disaster of its own and/or to accommodate third-party subscribers in the event of a third-party communication disaster, each operator may build a core network node (e.g., MME, S-GW, P-GW) for disaster roaming.

In normal times, the corresponding system should be ready to accept roaming calls through preliminary network interworking between operators, and may accommodate roaming calls between operators by taking follow-up measures according to occurrence criteria when a communication disaster occurs. Pre- and post-measures may follow consultations between operators.

In FIG. 6, it is shown as an example that MINT is applied in an Evolved Packet System (EPS), but MINT may also be applied in a 5G system.

Regarding MINT, the following terms may be defined.

Disaster Condition: This is the condition that a government decides when to initiate and terminate (e.g., a natural disaster). When this condition applies, users may have the opportunity to mitigate service interruptions and failures.

Disaster Inbound Roamer: A user that (a) cannot get service from the PLMN it would normally be served by, due to failure of service during a Disaster Condition, and (b) is able to register with other PLMNs.

Disaster Roaming: This is the special roaming policy that applies during a Disaster Condition.

Regarding MINT, the following requirements may be considered.

A mobile network may fail to provide service in the event of a disaster (e.g., a fire.) The 5GS may provide functionality to mitigate interruption of service. If there are PLMN operators prepared to offer service, UEs may obtain service from the corresponding PLMN in the event of a disaster. MINT is constrained to a particular time and place. To reduce the impact to the 5G system of supporting Disaster Roaming, the potential congestion resulting from an influx or outflux of Disaster Inbound Roamers is taken into account.

Subject to regulatory requirements or operator's policy, 3GPP system may be able to enable a UE of a given PLMN to obtain connectivity service (e.g., voice call, mobile data service) from another PLMN for the area where a Disaster Condition applies.

The 3GPP system may enable UEs to obtain information that a Disaster Condition applies to a particular PLMN or PLMNs.

If a UE has no coverage of its Home PLMN (HPLMN), then obtains information that a Disaster Condition applies to the UE's HPLMN, the UE may register with a PLMN offering Disaster Roaming service.

The 3GPP system may support means for a PLMN operator to be aware of the area where Disaster Condition applies.

The 3GPP system may be able to support provision of service to Disaster Inbound Roamer only within the specific region where Disaster Condition applies.

The 3GPP system may be able to provide efficient means for a network to inform Disaster Inbound roamers that a Disaster Condition is no longer applicable.

Subject to regulatory requirements or operator's policy, the 3GPP system may support a PLMN operator to be made aware of the failure or recovery of other PLMN(s) in the same country when the Disaster Condition is applies, or when the Disaster Condition is not applicable.

The 3GPP system may be able to provide means to enable a UE to access PLMNs in a forbidden PLMN list if a Disaster condition applies and no other PLMN is available except for PLMNs in the forbidden PLMN list.

The 3GPP system may provide means to enable that a Disaster Condition applies to UEs of a specific PLMN.

The 3GPP system may be able to provide a resource efficient means for a PLMN to indicate to potential Disaster Inbound Roamers whether they can access the PLMN or not.

Disaster Inbound Roamers may perform network reselection when a Disaster Condition has ended.

The 3GPP system may minimize congestion caused by Disaster Roaming.

3GPP system may be able to collect charging information for a Disaster Inbound Roamer with information about the applied disaster condition.

Regarding access control for a UE that satisfies the Disaster Condition, access identity number 4 may be applied. The configuration may be valid for PLMNs that indicate to potential Disaster Inbound Roamers that the UEs can access the PLMN.

Regarding the MINT, network selection may be performed as follows.

At switch on, when in coverage of the last registered PLMN as stored in the SIM/USIM, the UE attaches to that network.

As an option, in automatic selection mode, when no Equivalent HPLMN (EHPLMN) list is present, the UE may select the HPLMN. When the EHPLMN list is present, the UE may select the highest priority EHPLMN among the available EHPLMNs. The operator may able to control the UE behavior by USIM configuration.

As an option, if the UE is in manual network selection mode at switch-on
   if the last registered PLMN is unavailable and no equivalent PLMN is available, and
   and the UE finds it is in coverage of either the HPLMN or an EHPLMN
then the UE may register on the corresponding HPLMN or EHPLMN. The UE remains in manual network selection mode.

If the UE returns to coverage of the PLMN on which it is already registered (as indicated by the registered PLMN stored in the SIM/USIM), the UE may perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it may be used. The operator may be able to control by USIM configuration whether a UE that supports this option shall follow this alternative behavior.

The default behavior for a UE is to select the last registered PLMN.

If there is no registered PLMN stored in the SIM/USIM, or if this PLMN is unavailable and no equivalent PLMN is available, or the attempted registration fails, the UE may follow one of the following procedures for network selection.

A) Automatic Network Selection Mode

The UE may select and attempt registration on other PLMNs, if available and allowable, if the location area is not in the list of "forbidden LAs for roaming" and the tracking area is not in the list of "forbidden TAs for roaming", in the following order.

i) An EHPLMN if the EHPLMN list is present or the HPLMN (derived from the IMSI) if the EHPLMN list is not present, for preferred access technologies in the order specified. In the case that there are multiple EHPLMNs present then the highest priority EHPLMN is selected.

ii) each entry in the "User Controlled PLMN Selector with Access Technology" data field in the SIM/USIM (in priority order).

iii) each entry in the "Operator Controlled PLMN Selector with Access Technology" data field in the SIM/USIM (in priority order).

iv) other PLMN/access technology combinations with sufficient received signal quality in random order.

v) all other PLMN/access technology combinations in order of decreasing signal quality.

It may be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the Forbidden PLMN data field in the SIM/USIM. This data field may be extended in the Mobile Equipment (ME) memory. In the case of a UE operating in UE operation mode C, an allowable PLMN is one which is not in the Forbidden PLMN data field in the SIM/USIM or in the list of forbidden PLMNs for GPRS service in the ME. When there is no available PLMN except for PLMNs in the Forbidden PLMN data field in the SIM/USIM, and the available PLMNs indicate that Disaster Condition applies, this PLMN may be considered allowable for registration to the UE while the Disaster Condition is applicable.

If successful registration is achieved, the UE may indicate the selected PLMN.

If registration cannot be achieved on any PLMN and at least one PLMN offering restricted local operator services has been found, the UE may obtain user consent for restricted local operator services and the UE may use a list of preferred PLMNs for restricted local operator services stored in the ME. If none of the preferred PLMNs for restricted local operator services is available, the UE may select any available PLMN offering restricted local operator services. If one of these PLMNs for restricted local operator service is chosen, the UE may indicate the choice. If none are selected, the UE may wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services has been found, the UE may indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritizing the search in favor of Broadcast Control Channel (BCCH) carriers which have a high probability of belonging to an available and allowable PLMN.

B) Manual Network Selection Mode

The UE may indicate PLMNs, including Forbidden PLMNs, which are available. If there are none, this may also be indicated. The HPLMN of the user may provide on the USIM additional information about the available PLMNs, if this is provided then the UE may indicate that information to the user. This information, provided as free text may include the followings.

Preferred partner,
roaming agreement status,
supported services

Furthermore, the UE may indicate whether the available PLMNs are present on one of the PLMN selector lists (e.g., EHPLMN, User Controlled, Operator Controlled or Forbidden) as well as not being present on any of the lists.

For the purpose of presenting the names of the available PLMNs to the user, the ME may use the USIM defined names if available or other PLMN naming rules in priority order (Country/PLMN indication).

Any available PLMNs is presented in the following order.
i) HPLMN (if the EHPLMN list is not present); or if one or more of the EHPLMNs are available, then based on an optional data field on the USIM, either the highest priority available EHPLMN is to be presented to the user or all available EHPLMNs are presented to the user in priority order. If the data field is not present, then only the highest priority available EHPLMN is presented.
ii) PLMNs contained in the "User Controlled PLMN Selector" data field in the SIM/USIM (in priority order)
iii) PLMNs contained in the "Operator Controlled PLMN Selector" data field in the SIM/USIM (in priority order)
iv) other PLMN/access technology combinations with sufficient received signal level in random order
v) all other PLMN/access technology combinations in order of decreasing signal strength.

If a PLMN does not support voice services, then this is indicated to the user.

The user may select the desired PLMN and the UE attempts registration on this PLMN (This may take place at any time during the presentation of PLMNs).

If registration cannot be achieved on any PLMN and at least one PLMN offering restricted local operator services has been found, the UE may obtain user consent for restricted local operator services and offer the user to select one of these networks. If one of these networks is selected, the UE may indicate the selected PLMN, wait until a new PLMN is detected, or new location areas or tracking areas of an allowed PLMN are found which are not in the forbidden LA or TA list(s), and then repeat the procedure.

If the registration cannot be achieved on any PLMN and no PLMN offering restricted local operator services is selected, the UE may indicate "No Service". The user may then select and attempt to register on another or the same PLMN following the above procedure. The UE shall not attempt to register on a PLMN which has not been selected by the user.

Once the UE has registered on a PLMN selected by the user, the UE does not automatically register on a different PLMN unless:
i) The new PLMN is declared as an equivalent PLMN by the registered PLMN; or,
ii) The user selects automatic mode.

If a PLMN is selected but the UE cannot register on it because registration is rejected with the cause "PLMN not allowed", the UE may add the PLMN to the Forbidden PLMN list. The UE shall not re-attempt to register on that network unless the same PLMN is selected again by the user.

If a PLMN is selected but the UE cannot register for Packet Switched (PS) services on it because registration is rejected with the cause "GPRS services not allowed in this PLMN", the UE shall not re-attempt to register for Evolved UMTS Terrestrial Radio Access Network (E-UTRAN) or UTRAN PS or GSM EDGE Radio Access Network (GERAN) PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

If a PLMN is selected but the UE cannot register on it for other reasons, the UE may, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favor of BCCH carriers of the registered PLMN.

When a registration attempt by the UE is rejected by a network with an indication of "permanent" PLMN restriction, the PLMN identity may be written to a list of Forbidden PLMNs stored in a data field in the SIM/USIM.

If a successful registration is achieved on a PLMN in the Forbidden PLMN list, the corresponding PLMN may be deleted from the list. However, if successful registration is achieved on a PLMN in the Forbidden PLMN list while Disaster Condition applies, the PLMN may not be deleted from Forbidden PLMN list.

When in automatic mode, the UE may indicate any PLMNs which will not be selected due to their presence in the Forbidden PLMN list.

If a UE receives an equivalent PLMN list containing a PLMN which is included in the Forbidden PLMN list, this PLMN may be removed from the equivalent PLMN list before this is stored by the UE.

A disaster may occur while the UE camps on the RAN and/or cell of the HPLMN and is receiving service normally. Disasters may occur on various aspects of the network. For example, a disaster may occur in a function of a core network or in a section between a core network and a RAN node. In this case, the following problems may occur in applying MINT and/or disaster roaming.

(1) With Regard to Disaster Situation Information Delivery to the UE

As described above, the 3GPP system should allow the UE to obtain information that disaster conditions apply to a specific PLMN. However, in reality, when a disaster suddenly occurs while the UE is normally receiving service, it may be difficult to receive disaster situation information within a short time in a situation where the UE has already camped on a specific RAN and/or cell. That is, a delay may occur in transmitting disaster situation information.

(2) With Regard to PLMN Selection

Even after the UE recognizes a disaster situation and proceeds with roaming to another neighboring PLMN, the UE may periodically perform PLMN search to reselect the HPLMN. If the UE does not move much, it is highly likely that the UE is still within the coverage of the RAN node (i.e., the RAN node is still within coverage), and since no disaster has occurred between the UE and the RAN node, the HPLMN may be exposed during the PLMN selection process. The HPLMN has the highest priority in the PLMN selection process. However, the registration procedure after selecting the HPLMN will naturally fail because a disaster has occurred in the section between the core network and the RAN node. As a result, such HPLMN selection not only has no meaning, but also causes a UE receiving a roaming service through disaster roaming to perform PLMN selection unnecessarily, which may cause service interruption.

Hereinafter, according to implementations of the present disclosure, when a disaster occurs in a communication network to which the UE is connected and communication services cannot be provided from the communication network, a method for minimizing interruption in providing a communication service to the UE by effectively receiving disaster occurrence information through the RAN node where the UE received service will be described.

When a disaster occurs, a response method may vary depending on the type of disaster or the entity in the system that becomes inoperable due to the occurrence of the disaster. In the present disclosure, it is assumed that a RAN node (e.g., eNB or gNB) itself has no problem, but a disaster occurs in some functions of the core network and/or a section/interface between the RAN node and the core network. In this case, the area in which service is interrupted due to the disaster may be an area covered by the RAN node or an area covered by the core network node (e.g., AMF) where the disaster occurs.

Hereinafter, UE and terminal may be used interchangeably. Various implementations and/or embodiments of the present disclosure to be described below may be applied to various services, such as eMBB, V2X communication, public safety, IoT, etc. In addition, various implementations and/or embodiments of the present disclosure to be described below may be applied to various types of terminals, e.g., smart phones, vehicles, IoT terminals, robots, etc.

Various implementations and/or embodiments of the present disclosure to be described below may be individually performed, or two or more may be combined to be performed in a complex manner. In addition, combinations of one or more actions/configurations/steps of various implementations and/or embodiments of the present disclosure described below may be performed.

According to implementations of the present disclosure, the network may configure information to determine a disaster situation when installing a RAN node. The information may be configured by Operation Administration Maintenance (OAM). Alternatively, the information may be configured by a keep alive mechanism. Alternatively, the information may be configured by exchanging information with neighboring RAN nodes. The information may include disaster information about roaming PLMN (PLMN that temporarily provides services to users of a network where a disaster occurs) to which a user is sent when a disaster occurs and/or disaster recovery time information.

According to implementations of the present disclosure, the RAN node that determines that a disaster situation has occurred according to the configured information may stop all broadcasting and broadcast only the SIB including disaster occurrence information. The SIB including the disaster occurrence information may be a new SIB, SIBx, and/or a new component included in SIB1. The disaster occurrence information may include information such as whether a disaster has occurred, a disaster-occurring PLMN, and/or a disaster roaming providing PLMN.

According to implementations of the present disclosure, the UE receiving the SIB including the disaster occurrence information may perform PLMN selection based on this. In this case, the priority of the disaster-occurring PLMN may be set to the lowest priority in the PLMN selection process.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
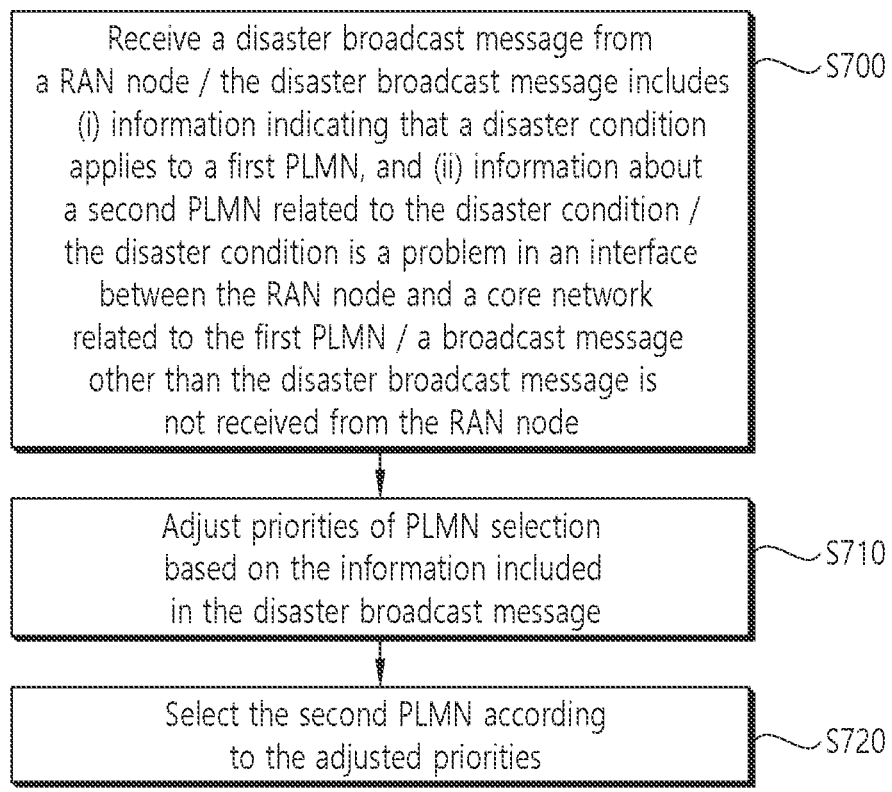
FIG. 7 shows an example of a method performed by a UE to which implementations of the present disclosure is applied.

FIG. 7 shows an example of a method performed by a UE to which implementations of the present disclosure is applied.

In step S700, the method comprises receiving a disaster broadcast message from a RAN node. The disaster broadcast message includes (i) information indicating that a disaster condition applies to a first Public Land Mobile Network (PLMN), and (ii) information about a second PLMN related to the disaster condition. The disaster condition is a problem in an interface between the RAN node and a core network related to the first PLMN. A broadcast message other than the disaster broadcast message is not received from the RAN node. That is, broadcasting of other broadcast messages other than the disaster broadcast message is stopped.

In some implementations, the information indicating that the disaster condition applies to the first PLMN may indicate that a service through the first PLMN is unavailable.

In some implementations, the information indicating that the disaster condition applies to the first PLMN may include a PLMN ID of the first PLMN.

In some implementations, the information about the second PLMN may include only a Mobile Network Code (MNC) among components of a PLMN ID of the second PLMN.

In some implementations, the second PLMN may be preferentially negotiated and/or determined in advance according to national regulations.

In some implementations, the disaster broadcast message may include disaster prediction time information.

In step S710, the method comprises adjusting priorities of PLMN selection based on the information included in the disaster broadcast message.

In some implementations, the information included in the disaster broadcast message may be informed to a Non-Access Stratum (NAS) layer of the UE.

In step S720, the method comprises selecting the second PLMN according to the adjusted priorities.

In some implementations, a priority of the second PLMN may be adjusted to be higher than a priority of the first PLMN.

In some implementations, the UE may be in communication with at least one of a mobile device, a network, and/or autonomous vehicles other than the UE.

Furthermore, the method in perspective of the UE described above in FIG. 7 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

The UE receives, via the at least one transceiver, a disaster broadcast message from a RAN node. The disaster broadcast message includes (i) information indicating that a disaster condition applies to a first Public Land Mobile Network (PLMN), and (ii) information about a second PLMN related to the disaster condition. The disaster condition is a problem in an interface between the RAN node and a core network related to the first PLMN. A broadcast message other than the disaster broadcast message is not received from the RAN node. That is, broadcasting of other broadcast messages other than the disaster broadcast message is stopped.

In some implementations, the information indicating that the disaster condition applies to the first PLMN may indicate that a service through the first PLMN is unavailable.

In some implementations, the information indicating that the disaster condition applies to the first PLMN may include a PLMN ID of the first PLMN.

In some implementations, the information about the second PLMN may include only a Mobile Network Code (MNC) among components of a PLMN ID of the second PLMN.

In some implementations, the second PLMN may be preferentially negotiated and/or determined in advance according to national regulations.

In some implementations, the disaster broadcast message may include disaster prediction time information.

The UE adjusts priorities of PLMN selection based on the information included in the disaster broadcast message.

In some implementations, the information included in the disaster broadcast message may be informed to a Non-Access Stratum (NAS) layer of the UE.

The UE selects the second PLMN according to the adjusted priorities.

In some implementations, a priority of the second PLMN may be adjusted to be higher than a priority of the first PLMN.

Furthermore, the method in perspective of the UE described above in FIG. 7 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: obtaining a disaster broadcast message, wherein the disaster broadcast message includes (i) information indicating that a disaster condition applies to a first PLMN, and (ii) information about a second PLMN related to the disaster condition, wherein the disaster condition is a problem in an interface between a RAN node and a core network related to the first PLMN, and wherein a broadcast message other than the disaster broadcast message is not received from the RAN node, adjusting priorities of PLMN selection based on the information included in the disaster broadcast message, and selecting the second PLMN according to the adjusted priorities.

Furthermore, the method in perspective of the UE described above in FIG. 7 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions to cause at least one processor to perform operations. The operations comprise: obtaining a disaster broadcast message, wherein the disaster broadcast message includes (i) information indicating that a disaster condition applies to a first PLMN, and (ii) information about a second PLMN related to the disaster condition, wherein the disaster condition is a problem in an interface between a RAN node and a core network related to the first PLMN, and wherein a broadcast message other than the disaster broadcast message is not received from the RAN node, adjusting priorities of PLMN selection based on the information included in the disaster broadcast message, and selecting the second PLMN according to the adjusted priorities.

Figure 8:
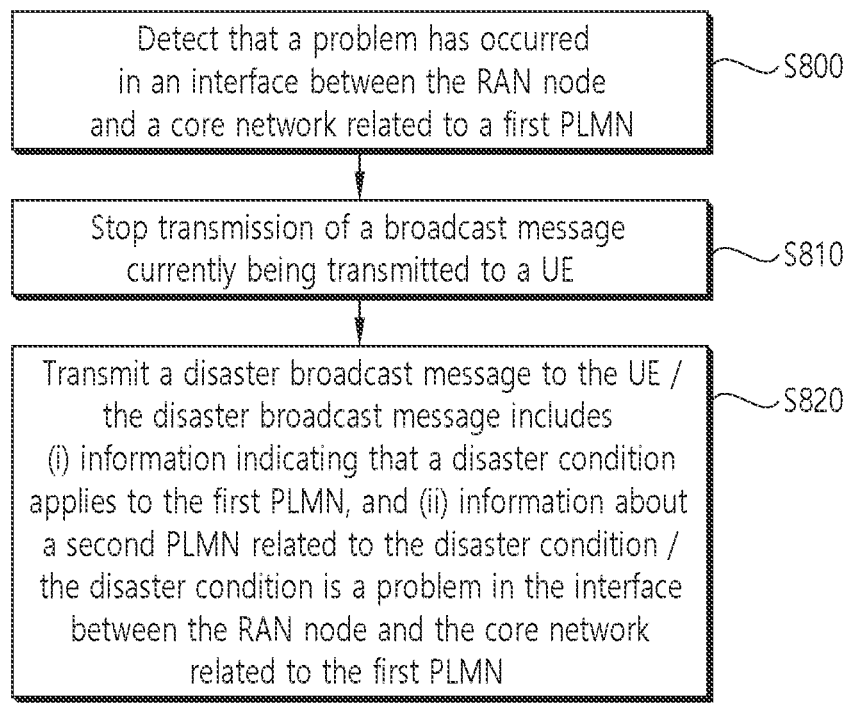
FIG. 8 shows an example of a method performed by a RAN node to which implementations of the present disclosure is applied.

FIG. 8 shows an example of a method performed by a RAN node to which implementations of the present disclosure is applied.

In step S800, the method comprises detecting that a problem has occurred in an interface between the RAN node and a core network related to a first PLMN.

In some implementations, the problem in the interface between the RAN node and the core network related to the first PLMN may be detected based on information configured by a network, and the information may be configured by an OAM or keep alive mechanism or information exchange with neighboring RAN nodes.

In step S810, the method comprises stopping transmission of a broadcast message currently being transmitted to a UE.

In step S820, the method comprises transmitting a disaster broadcast message to the UE. The disaster broadcast message includes (i) information indicating that a disaster condition applies to the first PLMN, and (ii) information about a second PLMN related to the disaster condition, and the disaster condition is a problem in the interface between the RAN node and the core network related to the first PLMN.

In some implementations, the information indicating that the disaster condition applies to the first PLMN may indicate that a service through the first PLMN is unavailable.

In some implementations, the information indicating that the disaster condition applies to the first PLMN may include a PLMN ID of the first PLMN.

In some implementations, the information about the second PLMN may include only an MNC among components of a PLMN ID of the second PLMN.

In some implementations, the second PLMN may be preferentially negotiated and/or determined in advance according to national regulations.

In some implementations, the disaster broadcast message may include disaster prediction time information.

Furthermore, the method in perspective of the RAN node described above in FIG. 8 may be performed by the second wireless device 200 shown in FIG. 2 and/or the wireless device 200 shown in FIG. 3.

More specifically, the RAN node comprises at least one transceiver, at least one processor, and at least one memory operably connectable to the at least one processor. The at least one memory stores instructions to cause the at least one processor to perform operations below.

The RAN node detects that a problem has occurred in an interface between the RAN node and a core network related to a first PLMN.

In some implementations, the problem in the interface between the RAN node and the core network related to the first PLMN may be detected based on information configured by a network, and the information may be configured by an OAM or keep alive mechanism or information exchange with neighboring RAN nodes.

The RAN node stops transmission of a broadcast message currently being transmitted to a UE.

The RAN nodes transmits a disaster broadcast message to the UE. The disaster broadcast message includes (i) information indicating that a disaster condition applies to the first PLMN, and (ii) information about a second PLMN related to the disaster condition, and the disaster condition is a problem in the interface between the RAN node and the core network related to the first PLMN.

In some implementations, the information indicating that the disaster condition applies to the first PLMN may indicate that a service through the first PLMN is unavailable.

In some implementations, the information indicating that the disaster condition applies to the first PLMN may include a PLMN ID of the first PLMN.

In some implementations, the information about the second PLMN may include only an MNC among components of a PLMN ID of the second PLMN.

In some implementations, the second PLMN may be preferentially negotiated and/or determined in advance according to national regulations.

In some implementations, the disaster broadcast message may include disaster prediction time information.

Hereinafter, various implementations of the present disclosure are described in detail.
1. First Implementation A network or a network operator operating the network may configure disaster situation related information that helps the RAN node determine a disaster situation in the process of initially installing a RAN node. The disaster situation related information may be configured in the RAN node in the NG setup and/or S1 setup procedure of the RAN node.

For example, the network may configure conditions for the RAN node to determine when a disaster occurs, i.e., information related to disaster conditions, to the RAN node. The information related to the disaster conditions may be configured by OAM. The information related to the disaster conditions may be configured by a keep alive mechanism. For example, it may be considered as a disaster condition that there is no response to the default keep-alive message for a certain period of time or more. The information related to the disaster conditions may be configured by information exchange between neighboring RAN nodes connected through an Xn interface. However, it should be distinguishable from the operation of a general RAN node.

For example, the network may configure PLMN information for disaster roaming to the RAN node in the event of a disaster. The PLMN information for disaster roaming may follow negotiations between operators and/or national regulatory requirements. The number of PLMNs for disaster roaming may be at least one or more.

For example, the network may selectively configure information related to a service interruption time in the event of a disaster until the disaster situation is restored to the RAN node. The service interruption time may be derived statistically and/or based on predictions.
2. Second Implementation The RAN node may detect a disaster situation according to the disaster situation related information received in the first implementation. When the RAN node detects or is notified of a disaster situation, the RAN node may perform the following operations.

(1) A RAN node may stop broadcasting of all broadcast messages (e.g., system information) it is currently performing. The broadcast message in which the broadcasting is stopped may include all types of broadcast messages such as SIB and/or Master Information Block (MIB), etc. This is to stop broadcasting of broadcast messages related to all capabilities since the RAN node cannot currently provide services, and to prevent information of the PLMN provided with service through the RAN node from being exposed to UEs within coverage.

(2) The RAN node may broadcast disaster broadcast information, instead of a broadcast message in which the broadcasting is stopped. The disaster broadcast information may be broadcast through a newly defined broadcast message (e.g., SIB x) or may be broadcast as a new component of a conventional broadcast message (e.g., SIB1).

The disaster broadcast information may include disaster situation occurrence information notifying that a disaster has occurred. This is to allow the UE to recognize that the disaster condition has been satisfied, and through this, the UE may attempt disaster roaming to a PLMN other than the current PLMN (e.g., HPLMN). Upon receiving the disaster situation occurrence information, the UE may enter a mode for disaster roaming.

The disaster situation occurrence information may be implicitly indicated only by whether or not the newly defined SIB x is broadcast or not. Alternatively, the disaster situation occurrence information may be expressed as a 1-bit indicator or other explicit information. For example, when the disaster situation occurrence information is expressed as a 1-bit indicator, it may be included in SIB1 or MIB and broadcast.

The disaster broadcast information may include disaster PLMN information. The disaster PLMN information may indicate information that service is unavailable due to a disaster occurring in the current PLMN. The disaster PLMN information may be expressed as the disaster situation occurrence information. In this case, the UE may know that service is unavailable in the current PLMN (e.g., HPLMN). Alternatively, the disaster PLMN information may be expressed as a PLMN ID of a PLMN where service is currently unavailable. When disaster broadcast information is broadcast through a newly defined broadcast message (e.g., SIB x), information about which PLMN service is unavailable is conveyed through the PLMN ID, thereby providing information to UEs whose PLMN is the HPLMN. The UE receiving this may no longer consider the corresponding PLMN in the PLMN selection process when the RAN node within coverage informs the disaster PLMN information.

The disaster broadcast information may include disaster roaming PLMN information that may be alternatively selected by the UE due to the occurrence of a disaster. The disaster roaming PLMN may be based on a value set in a RAN node. The number of disaster roaming PLMNs may be one or more. If the disaster roaming PLMN is located in the same country, the disaster roaming PLMN information may include, among Mobile Country Codes (MCCs) and MNC which are components of the PLMN ID, only the MNC and may omit the MCC. The disaster roaming PLMN should first be negotiated and/or determined in advance according to the country's regulations.

The disaster broadcast information may include information about an expected time of service interruption due to the occurrence of a disaster. The UE may predict how long to continue excluding the HPLMN from PLMN selection based on the information about the expected time of service interruption.

3. Third Implementation

The UE may receive the disaster broadcast information described in the second implementation.

The RRC layer of the UE may receive the disaster broadcast information from the RAN node providing the HPLMN service, and when the previously received broadcast message is no longer received, the disaster broadcast information may be informed to an upper layer (e.g., NAS layer). That is, the RRC layer may inform the NAS layer of disaster situation occurrence information, disaster PLMN information, disaster roaming PLMN information, and/or service interruption expected time information.

An upper layer (e.g., NAS layer) of the UE may perform PLMN selection again based on the disaster broadcast information. An upper layer of the UE may adjust priorities between PLMNs by reflecting the disaster broadcast information provided by the RRC. For example, the priority may be adjusted so that the priority of the disaster roaming PLMN is higher than that of the HPLMN, which has the highest priority under normal circumstances. Alternatively, it may reflect that the HPLMN is no longer served (e.g., adjust the priority of the HPLMN to the lowest priority).

The present disclosure can have various advantageous effects.

For example, in the event of a disaster in the 5G system, disaster information can be effectively provided to the UE through the RAN node that provided the service.

For example, it is possible to achieve enhancement of user experience and maintenance of service continuity by allowing the UE to effectively receive service without service interruption even in the event of a disaster.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be imple- mented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
acquiring system information from a base station of a first Public Land Mobile Network (PLMN);
receiving a disaster broadcast message,
wherein the disaster broadcast message includes (i) information related to a disaster condition applying to the first PLMN, and (ii) information related to a second PLMN providing a disaster roaming service,
wherein, based on the disaster condition applying to the first PLMN by a problem in an interface between the base station and a core network of the first PLMN, but not a problem in the base station itself;
i) the disaster broadcast message is received from the base station of the first PLMN, and
ii) the system information other than the disaster broadcast message transmitted from the base station of the first PLMN is not received anymore;
adjusting priorities of PLMN selection based on the disaster broadcast message; and
selecting the second PLMN based on the adjusted priorities.

2. The method of claim 1, wherein the information related to the disaster condition applying to the first PLMN informs that a service through the first PLMN is unavailable.

3. The method of claim 1, wherein the information related to the disaster condition applying to the first PLMN includes a PLMN ID of the first PLMN.

4. The method of claim 1, wherein the information related to the second PLMN includes only a Mobile Network Code (MNC) among components of a PLMN ID of the second PLMN.

5. The method of claim 1, wherein the second PLMN is preferentially negotiated and/or determined in advance according to national regulations.

6. The method of claim 1, wherein the disaster broadcast message includes disaster prediction time information.

7. The method of claim 1, wherein the information included in the disaster broadcast message is informed to a Non-Access Stratum (NAS) layer.

8. The method of claim 1, wherein a priority of the second PLMN is adjusted to be higher than a priority of the first PLMN.

9. The method of claim 1, wherein the method is performed by a user equipment (UE) in communication with at least one of a mobile device, a network, and/or autonomous vehicles other than the UE.

10. A User Equipment (UE) comprising:
at least one transceiver;
at least one processor, and
at least one memory operably connectable to the at least one processor and storing instructions that, based on being executed by the at least one processor, perform operations comprising:
acquiring, via the at least one transceiver, system information from a base station of a first Public Land Mobile Network (PLMN);
receiving, via the at least one transceiver, a disaster broadcast message, wherein the disaster broadcast message includes (i) information related to a disaster condition applying to the first PLMN, and (ii) information related to a second PLMN providing a disaster roaming service, wherein, based on the disaster condition applying to the first PLMN by a problem in an interface between the base station and a core network of the first PLMN, but not a problem in the base station itself:

i) the disaster broadcast message is received from the base station of the first PLMN, and ii) the system information other than the disaster broadcast message transmitted from the base station of the first PLMN is not received anymore;

adjusting priorities of PLMN selection based on the disaster broadcast message; and selecting the second PLMN based on the adjusted priorities.

11. The UE of claim 10, wherein the information related to the disaster condition applying to the first PLMN informs that a service through the first PLMN is unavailable.

12. The UE of claim 10, wherein the information related to the disaster condition applying to the first PLMN includes a PLMN ID of the first PLMN.

13. The UE of claim 10, wherein the information related to the second PLMN includes only a Mobile Network Code (MNC) among components of a PLMN ID of the second PLMN.

14. The UE of claim 10, wherein the disaster broadcast message includes disaster prediction time information.

15. A base station comprising:
at least one transceiver;
at least one processor; and
at least one memory operably connectable to the at least one processor and storing instructions that, based on being executed by the at least one processor, perform operations comprising:
detecting that a disaster condition applies to a first public land mobile network (PLMN) based on a problem in an interface between the base station and a core network of the first PLMN, but not a problem in the base station itself;
based on the disaster condition applying to the first PLMN:
i) stopping transmission of system information currently being transmitted to a User Equipment (UE); and
ii) transmitting, via the at least one transceiver, a disaster broadcast message to the UE,
wherein the disaster broadcast message includes (i) information related to the disaster condition applying to the first PLMN, and (ii) information related to a second PLMN related providing a disaster roaming service.

* * * * *